US012609906B2

(12) United States Patent
Gidon et al.

(10) Patent No.: US 12,609,906 B2
(45) Date of Patent: Apr. 21, 2026

(54) METHOD AND DEVICE FOR ASSISTING WITH UNSUBSCRIBING FROM A NEWSLETTER

(71) Applicant: ORANGE, Issy-les-moulineaux (FR)

(72) Inventors: Maryline Gidon, Chatillon Cedex (FR);
Tiphaine Marie, Chatillon Cedex (FR);
Fabrice Bourge, Chatillon Cedex (FR)

(73) Assignee: ORANGE, Issy-les-Moulineaux (FR)

( * ) Notice: Subject to any disclaimer, the term of this patent is extended or adjusted under 35 U.S.C. 154(b) by 52 days.

(21) Appl. No.: 18/754,801

(22) Filed: Jun. 26, 2024

(65) Prior Publication Data

US 2025/0007872 A1     Jan. 2, 2025

(30) Foreign Application Priority Data

Jun. 27, 2023    (FR) ...................................... 2306729

(51) Int. Cl.
| | |
|---|---|
| *H04L 51/42* | (2022.01) |
| *H04L 51/18* | (2022.01) |
| *H04L 51/214* | (2022.01) |
| *H04L 67/55* | (2022.01) |

(52) U.S. Cl.
CPC .............. *H04L 51/42* (2022.05); *H04L 67/55* (2022.05)

(58) Field of Classification Search
CPC ....... H04L 51/18; H04L 51/214; H04L 51/42; H04L 67/55; H04L 12/1859
See application file for complete search history.

(56) References Cited

U.S. PATENT DOCUMENTS

| | | | | |
|---|---|---|---|---|
| 8,935,342 B2 * | 1/2015 | Patel | ...................... | H04L 51/02 |
| | | | | 709/200 |
| 11,616,746 B1 * | 3/2023 | Singh | .................... | H04L 51/212 |
| | | | | 709/206 |
| 11,848,902 B2 * | 12/2023 | Parkinson | ............. | H04W 60/06 |
| 2013/0024520 A1 * | 1/2013 | Siminoff | .............. | G06Q 10/107 |
| | | | | 709/206 |
| 2015/0052203 A1 * | 2/2015 | Karnin | .................... | H04L 51/42 |
| | | | | 709/206 |
| 2015/0256499 A1 * | 9/2015 | Kumar | ................. | G06Q 10/107 |
| | | | | 707/755 |

(Continued)

FOREIGN PATENT DOCUMENTS

| | | |
|---|---|---|
| KR | 20030034888 A | 5/2003 |
| WO | 2014023631 A1 | 2/2014 |

OTHER PUBLICATIONS

"How to Unsubscribe from Mailing Lists and Newsletters in Gmail," Use Google Script to automatically unsubscribe from email newsletters in Gmail, Jul. 16, 2025. (Year: 2025).*

(Continued)

*Primary Examiner* — Alina A Boutah
(74) *Attorney, Agent, or Firm* — David D. Brush; Westman, Champlin & Koehler, P.A.

(57) ABSTRACT

A method for assisting with unsubscribing from a periodical newsletter. The newsletter is received by an electronic terminal of a user in the form of emails. The method is implemented by a device for assisting with unsubscribing and includes: characterization of an email received by the terminal as an email of the newsletter; and proposing to unsubscribe from the newsletter rendered to the user.

10 Claims, 2 Drawing Sheets

(56) References Cited

U.S. PATENT DOCUMENTS

Figure 1:
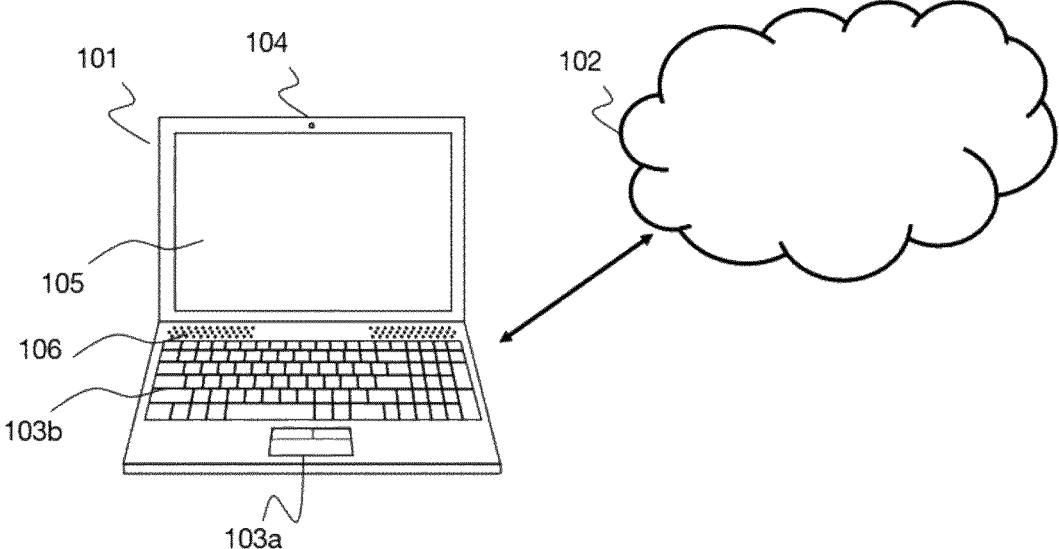

| | | | | |
|---|---|---|---|---|
| 2016/0205055 A1* | 7/2016 | Goutal | .................. | H04W 12/12 |
| | | | | 709/206 |
| 2017/0134516 A1* | 5/2017 | Gutman | .................. | H04L 67/55 |
| 2018/0375814 A1* | 12/2018 | Hart | ...................... | H04L 67/306 |
| 2019/0081917 A1* | 3/2019 | Goutal | .................. | H04W 12/12 |
| 2020/0236079 A1* | 7/2020 | Shulman | ............. | H04L 63/1425 |
| 2022/0131821 A1* | 4/2022 | Habal | .................... | H04L 51/42 |

OTHER PUBLICATIONS

Karrar Haider, "3 Ways to Unsubscribe from Email Newsletters in Gmail," Maketeacheasier, Jul. 15, 2016. (Year: 2016).*
Levine et al., "Signaling One-Click Functionality for List Email Headers," Internet Engineering Task Force (IETF), Request for Comments: 8058, Category: Standards Track, ISSN: 2070-1721, Jan. 2017. (Year: 2017).*
Gamzu et al., "Unsubscription: A Simple Way to Ease Overload in Email," Technical Presentation WSDM'18, Feb. 5-9, 2018, Marina Del Rey, CA, USA. (Year: 2018).*
French Search Report and Written Opinion dated Jan. 11, 2024 for corresponding French Application No. 2306729, filed Jun. 27, 2023.

* cited by examiner

METHOD AND DEVICE FOR ASSISTING WITH UNSUBSCRIBING FROM A NEWSLETTER

1. CROSS REFERENCE TO RELATED APPLICATION

This Application claims priority to French Patent Application No. FR 2306729, filed Jun. 27, 2023, the content of which is hereby incorporated by reference in its entirety.

2. FIELD OF THE DISCLOSURE

The present disclosure relates to the field of telecommunications and relates more particularly to the communication services executed on an electronic terminal such as a personal computer.

3. PRIOR ART

It is estimated that around 300 to 500 billion emails are sent each day worldwide. The environmental impact of a single email is negligible owing to its small size in terms of data and of the quantity of energy needed for the transmitting it (around 4 g of $CO_2$). However, when the enormous quantity of emails sent each day throughout the world are considered, the total carbon footprint becomes significant.

Electronic newsletters can represent a significant part of the email traffic. However, some of these publications may not have been requested or may no longer be wanted by the user. Currently, the law obliges a sender of a newsletter to provide an "unsubscribe" link within its content so that a subscriber is no longer able to receive these unwanted or no longer wanted emails. However, the rate of unsubscribing remains very low. This is because the process of unsubscribing may be seen by the subscriber as a waste of time. It is often simpler for them to continue receiving the emails without reading them. The subscriber may also be tempted to declare the email of the newsletter as undesirable email (in other words as "spam"). However, it is preferable to unsubscribe rather than marking the email of the newsletter as spam, because the unfair marking of legitimate emails as spam may be detrimental to the legitimate senders and may interfere with the "anti-spam" filters for other users.

It is evident that there does not exist a technical solution allowing a user to be assisted with unsubscribing from a newsletter.

4. SUMMARY

An exemplary aspect of the present disclosure relates to a method for assisting with unsubscribing from a newsletter, said newsletter being received by an electronic terminal of a user in the form of emails, said method being implemented by an unsubscribing assistance device and characterized in that it comprises the following steps:

characterization of an email received by said terminal as an email of said newsletter;

proposal to unsubscribe from said newsletter rendered to said user.

Advantageously, the solution allows the emails received by an electronic terminal of a user to be automatically processed in order to detect those issued by a newsletter and, where relevant, unsubscribing from the newsletter to be proposed. It should be noted that the emails issued by the newsletter may be sent out at regular time intervals (periodically) or otherwise.

One advantage of the solution provided is that it is simple to implement since it suffices, aside from the terminal already available to the user, to have a computing machine (potentially that already present in the terminal) in order to characterize an email received.

According to one particular embodiment of the disclosure, a method such as described hereinabove is characterized in that the characterization of said email received by said terminal as an email of said newsletter is determined according to the result of an analysis of the content and/or of the title of said email received.

This embodiment allows it to be determined whether an email received by an electronic terminal corresponds to an email of a newsletter. In concrete terms, the method determines that an email corresponds to an email of a newsletter depending on the result of an analysis of the content and/or of the title of the email received, for example, when the email comprises a particular content such as a hypertext link saying "unsubscribe" or else a title comprising one or more words (newsletter, newswatch, advertisement, catalogue, etc.) indicating unambiguously that the email corresponds to a publication of a newsletter.

According to one particular embodiment of the disclosure, a method such as described hereinabove is characterized in that the characterization of said email received by said terminal as an email of said newsletter is determined according to the email address of the sender of said email received.

This embodiment allows it to be determined whether an email received by an electronic terminal corresponds to an email of a newsletter. In concrete terms, the method determines that an email corresponds to an email of a newsletter depending on the email address of the sender of the email received. This is for example the case when the address comprises a particular term such as newsletter, newswatch, advertisement, catalogue, etc. or when the sender corresponds to a known online newsletter and/or newswatch service.

According to one particular embodiment of the disclosure, a method such as described hereinabove is characterized in that the proposal to unsubscribe is rendered depending on at least one action carried out by the user on at least one email received from said newsletter.

This embodiment allows a proposal to unsubscribe from a newsletter to be conditioned by the performance of one or more specific actions of the user on one or more emails of the newsletter received. In concrete terms, the method observes the activity of the user in order to identify whether the user uses/is interested in the newsletter or otherwise.

According to an embodiment particular of the disclosure, a method such as described hereinabove is characterized in that the proposal to unsubscribe is followed by a step for unsubscribing from the newsletter when said user validates said proposal.

This embodiment allows the unsubscribing process to be automated when the user wants it. For this purpose, the method may, for example, simulate a click on an unsubscribe hypertext link present in one of the emails of the newsletter received.

According to one particular embodiment of the disclosure, a method such as described hereinabove is characterized in that said at least one action belongs to the group comprising at least:

deleting;

reading;

marking;

opening and/or preview;

3 archiving;

printing;

copying all or part of the content of said email;

moving a cursor of a pointing device through the content of said email rendered to a display device;

moving the content of said email onto a display device;

selecting all or part of the content of said email;

adjusting or full screen setting of a display window rendering the content of said email;

etc.

It should be noted that the selection of all or part of the content of said email may correspond to underlining/selecting all or part of the content of one of the emails of the newsletter received and/or clicking a hypertext link contained in one of the emails of the newsletter received.

It should that also be noted the marking may correspond to giving an interest score (for example, 3 stars out of 5, or a "like") or a priority (high or low) to the content of the email of the newsletter.

According to one particular embodiment of the disclosure, a method such as described hereinabove is characterized in that said at least one action corresponds to the reading, by said user, of said at least one email of said newsletter received and in that the proposal to unsubscribe is furthermore rendered depending on the time spent by said user to read the content of said at least one email of said newsletter received.

This embodiment allows a proposal to unsubscribe to a newsletter to be conditioned by the time spent by the user to read the content of the email or emails of the newsletter received. When the reading time, cumulated or otherwise, of one or more emails of the newsletter received does not exceed a threshold (for example in seconds, minutes, hours or days) during a predefined period of time, then the method considers that the user has little or no interest in the content of the newsletter and proposes unsubscribing from it.

According to one particular embodiment of the disclosure, a method such as described hereinabove is characterized in that the proposal to unsubscribe is rendered depending on the value of an interest score associated with said newsletter.

This embodiment allows a proposal to unsubscribe from a newsletter to be conditioned by the value of an interest score. This score is, for example, obtained according to the activity of the user on the emails of the newsletter received. It may be calculated as a function:

of the reading time, by the user, of the email or emails of the newsletter;

of the interactions on the content or contents of the email or emails of the newsletter;

of the time to delete the email or emails of the newsletter. For example, on the average time calculated between the receipt of several emails of the newsletter and their manual deletion by the user;

of the time for opening the email or emails of the newsletter;

of the type of marking of the email or emails of the newsletter (for example high or low importance, personal, etc.

etc.

This score may also be obtained by the method from a third-party device such as a database.

The disclosure also relates to a device for assisting with unsubscribing from a newsletter, said newsletter being received by an electronic terminal of a user in the form of emails, characterized in that it comprises:

a module for characterizing an email received by said terminal as an email of said newsletter;

a module for a proposal to unsubscribe from said newsletter rendered to said user.

The term module may just as well correspond to a software component as to a hardware component or to an assembly of hardware and software components, a software component itself corresponding to one or more computer programmes or sub-programmes or, more generally, to any element of a programme designed to implement a function or a set of functions such as described for the modules in question. In the same way, a hardware component corresponds to any element of a hardware assembly designed to implement a function or a set of functions for the module in question (integrated circuit, smartcard, memory card, etc.).

The disclosure also relates to a computer programme comprising instructions for the implementation of the method hereinabove according to any one of the particular embodiments previously described, when said programme is executed by a processor. The method may be implemented in various ways, notably in a wired form or in a software form. This programme may use any given programming language and be in the form of source code, object code, or of code intermediate between source code and object code, such as in a partially compiled form, or in any other desired form.

The disclosure is also aimed at a recording medium or information medium readable by a computer and comprising instructions of a computer programme such as mentioned hereinabove. The aforementioned recording media may be any given entity or device capable of storing the programme. For example, the medium may comprise a storage means, such as a ROM, for example a CD ROM or a microelectronic circuit ROM, or else a magnetic recording means, for example a hard disk. On the other hand, the recording media may correspond to a transmissible medium such as an electrical or optical signal, which may be routed via an electrical or optical cable, by radio or by other means. The programmes according to the disclosure may in particular be down/uploaded over a network of the Internet type.

Alternatively, the recording media may correspond to an integrated circuit in which the programme is incorporated, the circuit being designed to execute or to be used in the execution of the method in question.

This device for assisting with unsubscribing from a newsletter and this computer programme exhibit features and advantages analogous to those previously described in relation to the method for assisting with unsubscribing from a newsletter.

5. LIST OF THE FIGURES

Figure 2:
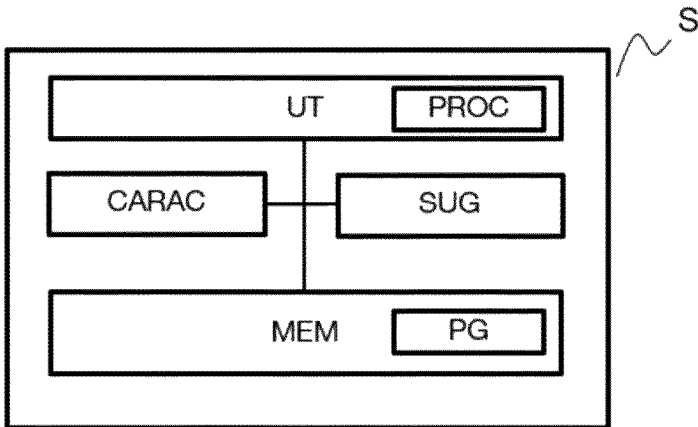
Figure 3:
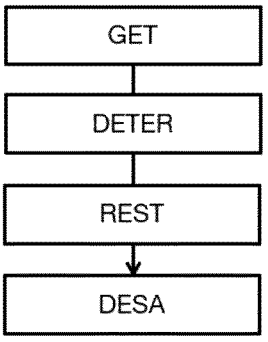

Other features and advantages of the disclosure will become more clearly apparent upon reading the following description of particular embodiments, given by way of simple illustrative and non-limiting examples, and from the appended drawings, amongst which:

FIG. 1 illustrates one example of an environment for implementation of the disclosure according to one particular embodiment of the disclosure, FIG. 2 illustrates the architecture of a device designed for the implementation of the method for assisting with unsubscribing, according to one particular embodiment of the disclosure, FIG. 3 illustrates the main steps of the method for assisting with unsubscribing according to one particular embodiment of the disclosure.

6. DETAILED DESCRIPTION OF ILLUSTRATIVE EMBODIMENTS

FIG. 1 illustrates one example of an environment for implementation of the disclosure according to one particular embodiment. The environment shown in FIG. 1 comprises at least one terminal 101 which incorporates a device for assisting with unsubscribing able to implement the method for assisting with unsubscribing according to the present disclosure.

The method for assisting with unsubscribing may operate permanently and autonomously as soon as the device is activated or else following a user action.

The terminal 101 is for example a terminal of the type: smartphone, tablet, connected television, connected object, onboard computer of a car, personal computer, server, gateway, etc.

One or more peripherals (105) for graphical rendering/display may be included in the terminal 101 or else connected (wired connection via a VGA, HDMI, USB cable etc. or else wireless via WiFi®, Bluetooth® technology, etc.). This or these rendering peripherals may be a display screen or a video projector.

According to one particular embodiment of the disclosure, the graphical rendering peripheral or peripherals may be connected to the terminal 101 via the network 102. Similarly, one or more input/pointing peripherals (103_a_, 103_b_) may be included in the terminal 101 or else connected (wired connection via a VGA, HDMI, USB cable etc. or else wireless via WiFi®, Bluetooth® technology, etc.). This or these pointing peripherals may be a keyboard, a mouse, a touch-sensitive surface, a camera (via oculometry technologies) (104), a microphone (via voice commands) or else any other peripheral capable of supplying localization and action data on an element displayed by a display peripheral of the terminal 101.

The terminal 101 may furthermore comprise one or more audio rendering peripherals 106, for example one or more loudspeakers capable of rendering a content of the text type vocally.

According to one particular embodiment of the disclosure, the device for assisting with unsubscribing may be situated in the network and/or distributed over one or more data processing machines such as computers, terminals or servers.

FIG. 2 illustrates a device S configured for implementing the method for assisting with unsubscribing according to one particular embodiment of the disclosure. The device S has the conventional architecture of a computer, and notably comprises a memory MEM, a processing unit UT, equipped for example with a processor PROC, and controlled by the computer programme PG stored in memory MEM. The computer programme PG comprises instructions for implementing the steps of the method for assisting with unsubscribing such as described further on with the aid of FIG. 3, when the programme is executed by the processor PROC.

Upon initialization, the code instructions of the computer programme PG are for example loaded into a memory prior to being executed by the processor PROC. The processor PROC of the processing unit UT notably implements the steps of the method for assisting with unsubscribing according to any one of the particular embodiments described in relation to FIG. 3 and according to the instructions of the computer programme PG.

The device S comprises a characterization module CARAC designed to determine/identify whether an email received by the terminal 101 comes from a newsletter. For this purpose, the module CARAC may analyze the content and/or the title of the email in order to look for the presence of key words indicating the nature of the email. For example, if the email comprises a particular content such as a hypertext link saying "unsubscribe" or else a title comprising one or more words such as "newsletter" or "newswatch", then the email may be characterized as an email received coming from a newsletter. Alternatively or cumulatively, the module CARAC may analyze the address of the sender of the email in order to look in it for key words such as "newsletter" or "newswatch" indicating that the email originates from a newsletter service.

The device S furthermore comprises a proposal/suggestion module SUG designed to propose unsubscribing from a newsletter.

FIG. 3 illustrates steps of the assistance method according to one particular embodiment of the disclosure. In this example, the method is executed by the terminal 101.

During the first step (step GET), the method obtains an email. The email is for example obtained from a messaging server or else from a digital storage space situated in the network or on the terminal 101. Once the email has been obtained, the method processes it in order to characterize it (step DETER), in other words to determine its nature. More exactly, the method tries to determine whether the email is an email issued by a newsletter service. This characterization may be carried out by the method according to the value of a parameter associated with the email, which parameter indicates, without ambiguity, whether or not it is an email issued by a newsletter service (for example, a parameter whose value is at "newsletter") or else via the analysis of the content and/or of the title of the email. In concrete terms, the analysis may correspond to the search for key words indicating the nature of the email. For example, if the email comprises a particular content such as a hypertext link saying "unsubscribe" or else a title comprising one or more words such as "newsletter" or "newswatch", then the email may be characterized as an email received coming from a newsletter.

Alternatively or cumulatively, the analysis may relate to the address of the sender of the email in order to search for key words such as "newsletter" or "newswatch" indicating that the email originates from a newsletter service (for example: newsletter.site@thecompany.com).

Alternatively or cumulatively, the analyse may furthermore relate to the frequency with which emails are received from the same sender. For example, if every Monday the user receives an email from the same sender, that may indicate that the email corresponds to a newsletter. According to one variant, the method may furthermore compare the titles of the emails received from this sender so as to verify that the title of the emails shows little or no change. Indeed, newsletters generally use the same title with a variable part which may correspond to the number of the week. According to one particular embodiment, techniques for calculating distance of the "Levenshtein" type may also be used to measure the proximity/the similarity between two chains of characters. As a reminder, the Levenshtein distance allows a measurement of the difference between two chains of characters to be given. It is equal to the number minimal of characters that need to be deleted, inserted or replaced in order to go from one chain to the other.

When the email is determined to be an email originated from a newsletter service, the method renders (step REST) vocally and/or graphically to the user of the terminal 101 a proposal to unsubscribe from the newsletter which has issued the email or emails received during the step GET.

According to one particular embodiment of the disclosure, when the user validates the proposal to unsubscribe, the method takes charge of unsubscribing (step DESA— automation of the unsubscribing process) by carrying out the actions needed to unsubscribe the user from the newsletter. For example, the method may simulate a click on a hypertext link for unsubscribing present in one of the emails of the newsletter. The method may also, when the process of unsubscribing requires it, complete an electronic form with data of the user, the data being, for example, obtained from the terminal 101 or from a server situated in the network.

According to one particular embodiment of the disclosure, the rendering (graphical and/or vocal) of the proposal to unsubscribe from the newsletter is conditioned by carrying out one or more specific actions of the user on one or more emails of the newsletter received. In concrete terms, the method observes the activity of the user in order to identify whether the user uses/is interested in the emails of the newsletter or not. The actions may for example correspond to:

- deleting an email;
- reading an email;
- marking an email;
- opening and/or previewing an email;
- archiving an email;
- printing an email;
- copying/pasting all or part of the content of an email of the newsletter;
- browsing (moving the cursor of a pointing device) through the content of an email of the newsletter rendered on a display device;
- moving the content of said email onto a display device;
- adjusting or setting to full screen a display window rendering the content of said email;
- selecting all or part of the content of an email of the newsletter;
- etc.

Thus, according to a first example, when the user deletes or marks as "read" without opening all or part of the emails originating from the newsletter, the method may consider that the content of this or these emails does not interest the user. The method then proposes, graphically and/or vocally, to the user to unsubscribe from the newsletter. According to a second example, when the user opens the email or emails, reads them and/or archives them in a folder and/or prints them, the method may consider that the content of this or these emails is of interest to the user. In this case, the method does not propose that the user unsubscribe from the newsletter.

Alternatively or cumulatively, the rendering of the proposal to unsubscribe from the newsletter may be conditioned by the time spent (in second(s), minute(s), hour(s), day(s)) by the user to read the content and/or to listen to the vocalized content of the email or emails of the newsletter. The reading time is for example determined via an oculometry technique, in other words the study of the gaze of the user ("eye tracking") captured by the camera 104, coupled with an event obtained from the terminal 101 (for example, an event of the operating system) indicating that an email of the newsletter is displayed at a given location on the display surface of the display peripheral 105. The method may then evaluate the time spent by the user to read an email of the newsletter rendered by the display peripheral 105. Thus, when the reading time, cumulated or otherwise, of one or more emails received from the newsletter does not exceed a threshold (for example 5 minutes) over a predefined period of time (for example 6 months), then the method may consider that the user has little or no interest in the content of the newsletter. In this case, the method proposes that the user unsubscribe from the newsletter. It should be noted that the predefined period of time may correspond to a sliding time window (the start of the period/window of time may vary over time) and be of variable or fixed size/duration.

It should be noted that the selection of all or part of the content may correspond to the underlining of all or part of the content of one of the emails of the newsletter received and/or to clicking a hypertext link contained in one of the emails of the newsletter received.

According to one particular embodiment of the disclosure, the rendering (graphical and/or vocal) of the proposal to unsubscribe from the newsletter is conditioned by the value of an interest score. This score is, for example, obtained according to the observed activity of the user on the emails of the newsletter received. It may be calculated as a function of:

- the time for reading, by the user, of the email or emails of the newsletter;
- the interactions on the content or contents of the email or emails of the newsletter;
- the time to delete the email or emails of the newsletter. For example, the mean time calculated between the receipt of several emails of the newsletter and their manual deletion by the user;
- the time to open the email or emails of the newsletter;
- the type of marking of the email or emails of the newsletter (for example high or low importance, personal, etc.);
- etc.

The calculation of an interest score will now be described in the case where 4 emails of the newsletter have already been obtained/received by the terminal 101.

| Action | Email no1 | Email no2 | Email no3 | Email no4 | Total |
|---|---|---|---|---|---|
| reading | 2 | 1 | 1 | 0 | 4 |
| archiving | 0 | 0 | 1 | 0 | 1 |
| deleting | 0 | −1 | 0 | −1 | −2 |
| printing | 1 | 0 | 0 | 0 | 1 |
| C | | | | | 1 |

The table hereinabove indicates the number of times that a given action has been carried out by the user on each email received from the periodical newsletter. For example, the user has read (entirely or partially) twice the first email, once the second and the third email and has not read the fourth email. An overall reading score for the newsletter is then calculated by the method at 4 (2+1+1+0).

The same exercise may be carried out for the archiving, deleting and printing actions. It should be noted that an email may be considered as read by the user when the time that he/she spent on reading the content of the email exceeds a threshold (for example 1 minute).

It should also be noted that the deleting action is recorded as negative. Indeed, the deletion indicates a potential lack of interest of the user. Thus, the overall score for deleting calculated by the method is equal to −2 (0−1+0−1) the emails 2 and 4 having been deleted by the user.

It goes without saying that this list of actions is given purely by way of non-limiting example. Many other actions of the user may be considered by the method for the calculation of the interest score. Similarly, other potential values and weightings associated with each action may be chosen.

The method subsequently calculates the interest score C. For this purpose, the method calculates the sum S of the overall scores of the actions and divides them by the number N of emails.

The interest score is therefore equal to: $C=S/N$.

In this example, the interest score corresponds to $(4+1-2+1)/4$, hence $C=1$. Thus, the interest score indicates that there has been, on average, one action proving an interest of the user carried out on each email of the newsletter.

If the value of the interest score is below a predetermined threshold, the latter being for example fixed at 1, the method may propose to the user to unsubscribe from the newsletter. In the case described hereinabove, the interest score is equal to 1. Since the interest score is not less than 1, the method then considers that the newsletter is of interest to the user and that there is no need to propose to him/her to unsubscribe.

It goes without saying that the embodiment which has been described hereinabove has been given purely by way of non-limiting example, and that many modifications may easily be applied by those skilled in the art without however straying from the scope of the disclosure. According to other particular embodiments of the disclosure, the interest score may be calculated by an artificial intelligence capable of learning over the months a behaviour of the user (reading, archiving, deleting, etc.) with regard to the emails of the newsletter.

According to another embodiment of the disclosure the interest score may be calculated according to actions and/or to a sequence of actions. For example, the method may determine that the user has read an email only if the reading of its content by the user exceeds a predefined duration and is associated with a particular area/part of the content (for example the main article situated in the email of the newsletter). Similarly, when the reading of an email by the user exceeds a predefined duration and that the latter subsequently deletes the email in question, the deleting action may then be ignored by the method for the calculation of the interest score. This is because, following his/her reading, the user has indeed shown an interest relating to the publication/the email of the newsletter and the deleting action is not then relevant in the calculation of the interest score.

What is claimed is:

1. A method for assisting with unsubscribing from a newsletter, said newsletter being received by an electronic terminal of a user in the form of emails, said method being implemented by a device for assisting with unsubscribing and comprising:

characterizing an email received by said terminal as an email of said newsletter; and generating a proposal to unsubscribe from said newsletter, the proposal being rendered to said user depending on a value of an interest score associated with said newsletter.

2. The method according to claim 1 wherein the characterization of said email received by said terminal as an email of said newsletter is determined according to a result of an analysis of a content and/or of a title of said email received.

3. The method according to claim 1 wherein the characterization of said email received by said terminal as an email of said newsletter is determined according to an email address of a sender of said email received.

4. The method according to claim 1 wherein the proposal to unsubscribe is rendered depending on at least one action carried out by the user on at least one email of said newsletter received.

5. The method according to claim 1 wherein the proposal to unsubscribe is followed by a step of unsubscribing from said newsletter in response to said user validating said proposal.

6. The method according to claim 4 wherein said at least one action belongs to the group consisting of:

deleting;

reading;

marking;

opening and/or previewing;

archiving;

printing;

copying all or part of a content of said email;

moving a cursor of a pointing device through the content of said email rendered to a display device;

moving the content of said email to a display device;

adjusting or full screen setting of a display window rendering the content of said email to a display device;

selecting all or part of the content of said email.

7. The method according to claim 4 wherein said at least one action corresponds to reading, by said user, said at least one email of said newsletter received and the proposal to unsubscribe is furthermore rendered depending on a time spent by said user to read a content of said at least one email of said newsletter received.

8. A device for assisting with unsubscribing from a periodical newsletter, said newsletter being received by an electronic terminal of a user in the form of emails, wherein the device comprises:

at least one processor; and at least one non-transitory computer readable medium comprising instructions stored thereon which when executed by the at least one processor configure the device to:

characterize an email received by said terminal as an email of said newsletter; and generate a proposal to unsubscribe from said newsletter, the proposal being rendered to said user depending on a value of an interest score associated with said newsletter.

9. A terminal or a server which comprises the device according to claim 8.

10. A non-transitory computer readable medium comprising instructions stored thereon for implementing a method for assisting with unsubscribing from a newsletter, said newsletter being received by an electronic terminal of a user in the form of emails, when the instructions are executed by a processor of a device, wherein the method comprises:

characterizing an email received by said terminal as an email of said newsletter; and generating a proposal to unsubscribe from said newsletter, the proposal being rendered to said user depending on a value of an interest score associated with said newsletter.

* * * * *